United States Patent [19]

Holm et al.

[11] Patent Number: 4,592,437

[45] Date of Patent: Jun. 3, 1986

[54] RADIATOR SAND SCREEN MOUNTING ARRANGEMENT

[75] Inventors: David R. Holm; Carl A. Wubben, both of Dubuque, Iowa

[73] Assignee: Deere & Company, Moline, Ill.

[21] Appl. No.: 695,147

[22] Filed: Jan. 25, 1985

[51] Int. Cl.$^4$ ............................................. B60K 11/04
[52] U.S. Cl. .................................... 180/68.6; 160/105
[58] Field of Search .................... 280/68.6, 68.4, 68.1; 49/463, 465; 160/105

[56] References Cited

U.S. PATENT DOCUMENTS

| | | | |
|---|---|---|---|
| 2,915,119 | 12/1959 | Cox | 160/105 X |
| 3,115,222 | 12/1963 | Goettl et al. | 49/463 X |
| 4,018,270 | 4/1977 | Kolinger et al. | 180/68.6 X |
| 4,169,501 | 10/1979 | Takeuchi et al. | 180/68.6 X |
| 4,424,996 | 1/1984 | Yoshiyuki | 180/68.6 X |

Primary Examiner—John J. Love
Assistant Examiner—Michael Mar

[57] ABSTRACT

A sand screen mounting arrangement for a vehicle having an engine compartment housing a fan oppositely aligned to a radiator including a plurality of screen members. The screen members are generally rectangular in shape and have a lip formed on one short side and a plurality of clips formed on the other short side for mounting within the compartment. The screen members are vertically stacked in close adjacent proximity to said radiator to rails mounted to respective sides of the radiator. An access door is provided in the engine compartment and fan shroud to allow removal of the screen members.

7 Claims, 5 Drawing Figures

RADIATOR SAND SCREEN MOUNTING ARRANGEMENT

BACKGROUND OF THE INVENTION

This invention relates to radiator sand screen mounting.

Off-road vehicles are often called upon to operate in sandy soil whereupon airborne sand particles are frequently drawn into the engine compartment in response to the air flow generated by the vehicle's engine cooling system. An engine driven fan forces air through a heat exchanger thereby transferring heat energy from the engine coolant fluid to the traversing air. The sand particles within the traversing air stream impact the cooling vanes of the radiator at such an angle as to create an erosive effect on the cooling vanes. It is known that the erosive effect of particulates can be reduced by using a sand screen which directs the fan generated air stream perpendicularly through the radiator vane such that the sand particles do not impact the radiator vanes.

It is often necessary to remove items plugged within the radiator core and sand screen. Conventional designs for mounting the sand screen and the radiator require that the sand screen be completely removed from the vehicle in order to clean the radiator core, and often times require disassembly of the vehicle's hood, grill housing, fan shroud, radiator supports and upper and lower radiator hoses and both engine compartment side shields.

SUMMARY OF THE INVENTION

It is an object of the present invention to present a sand screen mounting arrangement which permits removal of the sand screen without disassembly of other engine compartment components.

The engine compartment of some off-road vehicles includes a blower fan driven by an engine. Mounted adjacent to the blower fan is a radiator. A shroud is mounted within the engine compartment to extend between the radiator and the fan. Rails are mounted to respective vertical sides of the radiator to allow the sand screens to be vertically stacked and detachably mounted to the rails between the radiator and blower fan. Each screen has a generally rectangular shape and is mounted longitudinally lengthwise. At one vertical side of each screen is formed a plurality of clips to allow the screen to be clipped to one rail and formed along the other vertical side of each screen is a lip to allow the lip to be fastened to another rail by such means as screw. An access door is provided in the engine compartment hood and in the shroud to allow the screens to be removed therethrough without disturbing other engine compartment components.

DESCRIPTION OF THE PREFERRED EMBODIMENT

Figure 1:
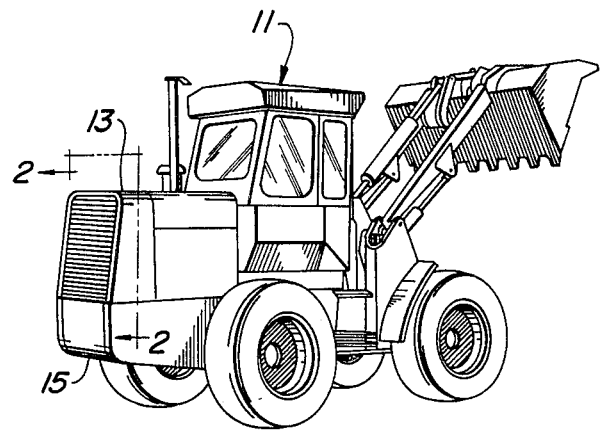
FIG. 1 is a prospective view of a wheel-loader employing the present invention.
Figure 2:
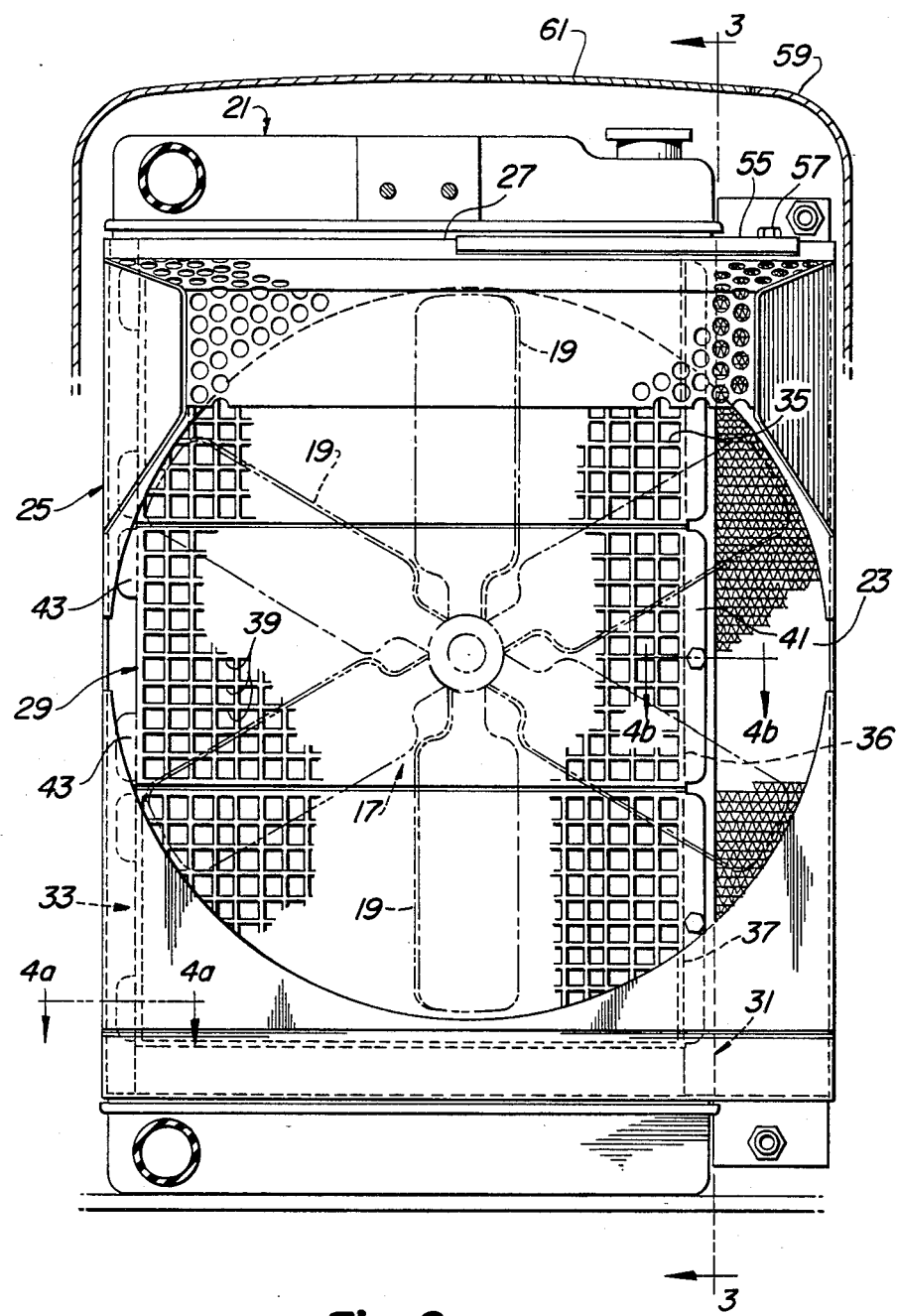
FIG. 2 is a front-elevational view of the sand screen mounting arrangement in accordance with the present invention.
Figure 3:
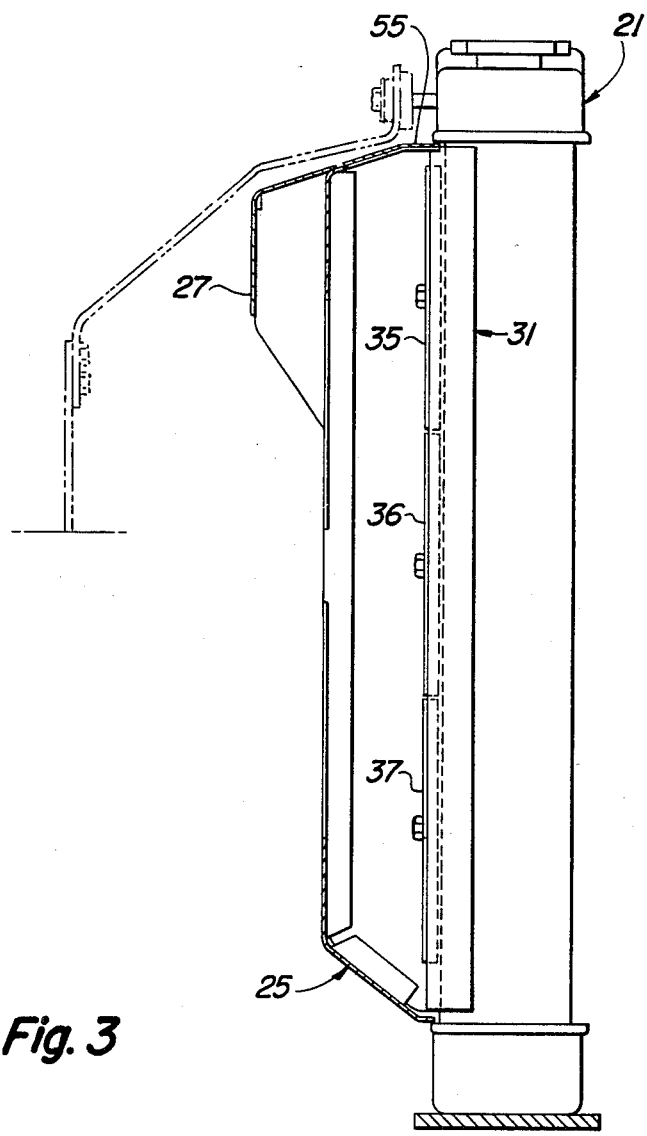
FIG. 3 is a side elevated view of the vehicle sand screen mounting arrangement.

Referring to FIG. 1 and 2, an off-road vehicle 11, such as a wheeled loader, includes an engine compartment 13 located rearwardly on the vehicle 11. Fixably mounted in the engine compartment 13 to the vehicle's frame 15 in a conventional manner in an engine (not shown) which among other things drives a blower fan 17 in a conventional manner. The blower fan 17 includes a plurality of radially spaced apart fan blades 19. Fixably mounted within the engine compartment 13 in a conventional manner opposite and in spaced apart relationship to blower fan 17 is a radiator 21. Also, fixably mounted in a conventional manner within the engine compartment 13 opposite to the blower fan 17 and to the side of radiator 21 is a heat exchanger 23. The heat exchanger 23 is conventionally associated with the vehicle's transmission cooling system which is well known to those skilled in the art. A shroud 25 is fixably mounted by any conventional means to extend depthwise between the radiator and a blower fan 17. The shroud 25 has a top portion 27 which extends forward and beyond the blower fan 17.

Conventionally, the blower fan 16 draws ambient air into the engine compartment 13 and propells the drawn air through the shroud 25 to traverse the radiator 21 and heater exchanger 23. In this customary manner, fluid traveling through the radiator 21 and heat exchanger 23 is cooled. To protect primarily the radiator 21 from premature failure due to erosive properties of airborne and particles, a sand screen 29 is fixedly mounted immediately adjacent to the radiator 21 between the blower fan 17 and radiator 21 on rails 31 and 33 in a manner to be described.

Figure 4A:
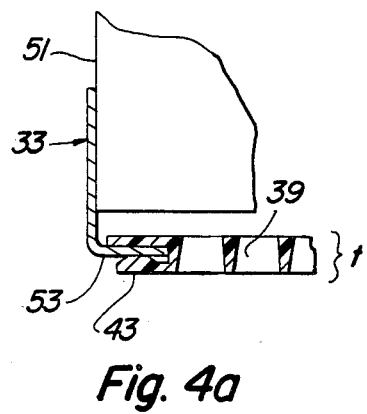
FIG. 4a is a sectioned view of one of the sand screens clipped to the first rail.
Figure 4B:
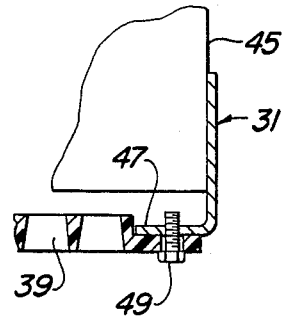
FIG. 4b is a sectional view of one of the sand screen mounted to a second rail.

Referring more particularly to FIGS. 2, 4a and 4b, comprising the sand screen 29 is a plurality of screen members 35, 36 and 37, respectively, vertically stacked. In the preferred embodiment, each screen member 35, 36 and 37 is formed identically, therefore, in the interest of brevity, only screen member 36 will be described in detail. Preferably, screen member 36 is a composition of a molded polymeric material, such as plastic. Screen member 36 is molded to have a core forming a plurality of generally rectangular cone shaped cells 39 of uniform thickness "t". The screen member 36 is molded such that each cell 39 is open ended and has a slightly diverging cross-sectional area with the divergence opposite the radiator 21. A lip 41 is formed molded vertically along one side of screen member 36 and a plurality of clips 43 are formed molded sequentially spaced apart and vertically along an opposite side of screen member 37. Rail 31 has a generally L-shaped cross section, and is fixedly mounted vertically along sidewall 45 of radiator 21 by any conventional means such as welding. The rail 31 includes a side 47 extending generally vertical and parallel to the inward face of radiator 21 such that lip 41 of screen member 36 can be positioned abutting along saide 47 and secured thereto by any conventional means such as screw 49. Rail 33 has a generally L-shaped cross section and is fixably mounted vertically along sidewall 51 of radiator 21 by any conventional means such as welding. The rail 33 includes a side 53 extending generally vertical and parallel to the inward face of radiator 21 such that clips 43 of screen member 36 can be securely clipped to rail 33. In such manner, each screen member 35, 36 and 37 is detachably mounted to extend transversely across the inward face of radiator 21.

Referring to FIG. 2, it is observed that the shroud 25 has an access door 55 detachably mounted thereto by any conventional means such as a bolt 57. It is also observed that engine compartment hood 59 has a access door 61 detachably mounted thereto by any conventional means aligned vertically opposite to access door 55. The screen members 35 and 37 can be removed in a manner identical to the removal of screen member 36 by opening door 61 to allow access door 55 to be detached and withdrawn from the engine compartment 13. One is then able to gain access through the engine compartment hood and opening is shroud 25 to remove screw 49 and release clips 43. Thereafter, the screen member 37 may be rotated approximately 90 degrees and drawn through the opening and through the engine compartment hood.

We claim:

1. A radiator sand screen for mounting in a vehicle having an engine compartment housing an engine driving a fan, a radiator located opposite said fan and a shroud extending between said fan and said radiator, comprising:
   a sand screen including a plurality of screen members, each of said screen members being generally rectangular shaped of generally uniform thickness, and having a core forming a plurality of open cells, each cell having a flow passage of decreasing cross-sectional area in the direction of the radiator and being oriented relative to said radiator such that air driven by said fan is directed through said open cells of said screen members to journey perpendicularly through said radiator;
   a first mounting rail fixably mounted vertically along one vertical side of said radiator;
   a second mounting rail fixably mounted vertically along the other vertical side of said radiator;
   first means for fixably and detachably mounting said screen members in vertically stacked relationship to said rails between said radiator and said fan in adjacent relationship to said radiator and spaced apart relationshion to said fan, said screen members having a generally horizontal extension; and
   second means for providing access to said screen members through said engine compartment and said shroud.

2. A radiator sand screen as claimed in claim 1, wherein said first means comprises:
   each of said screen members having formed on one short side a lip and having formed on the other short side a plurality of clips;
   a plurality of cap screws;
   each of said screen members being clipped to said second rail; and
   one of said cap screws threadably journeyed through a respective lip and said first rail.

3. A radiator sand screen as claimed in claim 1 or 2, wherein said second means comprises:
   a first access door pivotally mounted to said engine compartment's hood, and a second access door detachably mounted to said shroud and vertically aligned to said first access door.

4. A radiator sand screen and mounting arrangement for a vehicle having an engine compartment housing an engine driving a fan, a radiator located opposite said radiator and a shroud extending between said fan and said radiator, comprising:
   a sand screen having a generally rectangular shape of generally uniform thickness, and having a core forming a plurality of open cells oriented relative to said radiator such that air driven by said fan is directed through said open cells of said sand screen to journey generally perpendicularly through said radiator;
   a first mounting rail fixably mounted vertically along one vertical side of said radiator;
   a second mounting rail fixably mounted vertically along the other vertical side of said radiator;
   first means for fixably and detachably mounting to said rails, said sand screen having a generally vertically extension between said radiator and said fan in adjacent relationship to said radiator and spaced apart relationship to said fan, said first means including:
   said sand screen having formed on one short side a lip and having formed on the other short side a plurality of clips;
   a plurality of cap screws:
   each of said screen members being clipped to said second rail; and
   one of said cap screws threadably journaled through a respective lip and said first rail;
   second means for providing access to said screen members through said engine compartment and said shroud.

5. A radiator sand screen and mounting arrangement as claimed in claim 4, wherein said second means comprises:
   a first access door pivotally mounted to said engine compartment's hood, and a second access for detachably mounted to said shroud and vertically aligned to said first access door.

6. A radiator sand screen and mounting arrangement as claimed in claim 5 wherein each of said open cells has a flow passage of decreasing cross-sectional area in the direction of the radiator.

7. A radiator sand screen and mounting arrangement as claimed in claim 4, 5 or 6 wherein said sand screen comprises a plurality of screen members each of said sand screen members having a generally rectangular shape of generally uniform thickness and aligned to extend generally horizontally in a vertically stacked position.

* * * * *

UNITED STATES PATENT AND TRADEMARK OFFICE
CERTIFICATE OF CORRECTION

PATENT NO. : 4,592,437

DATED : 3 June 1986

INVENTOR(S) : David R. Holm and Carl A. Wubben

It is certified that error appears in the above-identified patent and that said Letters Patent is hereby corrected as shown below:

Column 3, line 44, "relationshion" should be --relationship--.
Column 4, line 44, "for" should be --door--.

Signed and Sealed this

Twenty-fourth Day of February, 1987

Attest:

DONALD J. QUIGG

Attesting Officer     Commissioner of Patents and Trademarks